United States Patent
Lee

(10) Patent No.: US 9,102,181 B2
(45) Date of Patent: Aug. 11, 2015

(54) METHOD FOR PRINTING DESIGNS ON SANDPAPER

(71) Applicant: Jae Hoon Lee, Seongnam (KR)

(72) Inventor: Jae Hoon Lee, Seongnam (KR)

(73) Assignees: Bodi Corporation (KR); Casper Company, LLC, Wilton, CT (US)

( * ) Notice: Subject to any disclaimer, the term of this patent is extended or adjusted under 35 U.S.C. 154(b) by 140 days.

(21) Appl. No.: 13/671,259

(22) Filed: Nov. 7, 2012

(65) Prior Publication Data

US 2014/0127407 A1     May 8, 2014

(51) Int. Cl.

| | |
|---|---|
| *B05D 5/00* | (2006.01) |
| *B41M 5/00* | (2006.01) |
| *B05D 7/00* | (2006.01) |
| *C09D 11/38* | (2014.01) |
| *C09D 11/40* | (2014.01) |
| *A45D 29/04* | (2006.01) |
| *C09D 11/32* | (2014.01) |

(52) U.S. Cl.
CPC ............... *B41M 5/0047* (2013.01); *B05D 7/00* (2013.01); *B41M 5/0041* (2013.01); *C09D 11/38* (2013.01); *A45D 2029/045* (2013.01); *C09D 11/32* (2013.01); *C09D 11/40* (2013.01)

(58) Field of Classification Search
None
See application file for complete search history.

(56) References Cited

U.S. PATENT DOCUMENTS

| | | | | |
|---|---|---|---|---|
| 3,560,641 | A * | 2/1971 | Taylor et al. | 358/296 |
| 5,764,263 | A * | 6/1998 | Lin | 347/101 |
| 5,969,003 | A * | 10/1999 | Foucher et al. | 523/160 |
| 6,394,099 | B1 * | 5/2002 | Daley | 132/76.4 |
| 2005/0166793 | A1* | 8/2005 | Looman et al. | 106/31.27 |
| 2007/0079841 | A1* | 4/2007 | Geils | 132/76.4 |
| 2008/0000387 | A1* | 1/2008 | Renner et al. | 106/31.59 |

* cited by examiner

*Primary Examiner* — Timothy Meeks
*Assistant Examiner* — Michael P Rodriguez
(74) *Attorney, Agent, or Firm* — St. Onge Steward Johnston & Reens LLC

(57) ABSTRACT

A method of printing on the sandpaper face of a nail grinding pad comprises printing, with an inkjet plotter printer onto a sandpaper surface, an ink composition including: 60% to 80% by weight of a polymer selected from the group consisting of: polypropylene glycol and its derivatives whose minimum molecular weight is around 200; polysaccharide and its derivatives; polyvinyl alcohol and its derivatives whose average molecular weight is around 10,000 to 200,000; polysucrose and its derivatives whose average molecular weight is around 40,000 to 400,000; and epoxy glycerol propoxylated glycerol and their derivatives whose average molecular weight is 500 to 10,000; and 2% to 10% by weight of a solvent dye or a pigment; 1% to 5% by weight percent of ethanol; and 0.1% to 1.0% by weight percent of surfactants.

13 Claims, No Drawings

METHOD FOR PRINTING DESIGNS ON SANDPAPER

FIELD OF THE INVENTION

The present invention relates to a printing method for printing designs on the sandpaper face of nail care products such as a nail grinding pad, e.g. an emery board or a nail file.

BACKGROUND OF THE INVENTION

Human nails and toenails grow continuously and need to regularly be trimmed. Since roughly trimmed nails or toenails have sharp edges which may lead to snagging of the nail, causing tearing damage to the nail or the material on which it is snagged, it is customary to file the trimmed nail until it is smooth. The typical nail filing tools are a nail grinding pad such as a plastic board with an applied sandpaper or abrasive or an emery board; or a metal nail file.

It has been known to apply designs, such as logos of beauty shops or of companies on the sandpaper face, and/or artwork to such nail grinding pads. The typical printing method for printing on the sandpaper face of a nail grinding pad is to laminate preprinted plastic film or sheet onto the sandpaper face of the nail grinding pad using a thermo compression bonding method. However, the oil based ink used to print designs and artwork on the plastic film or sheet often coats the sandpaper surface, decreasing the grinding efficiency of the sandpaper surface. Nail care products having a grinding face with a film of oil based ink will not grind or polish nails well and smoothly.

More recently, water based inks have been used to print designs on the laminating sheets applied to the sandpaper face of nail care products. However, a problem with this approach is that in many nail care products the sandpaper face is embossed very finely, and the water based inks tend to run along the embossing. In addition, since the printed designs are made up with various colors, different water based ink colors will tend to bleed into neighboring colors.

SUMMARY OF THE INVENTION

The present invention provides a method of printing designs and artwork on the grinding face of a nail care product, particularly nail grinding pads.

The present invention provides a printing method for printing on the grinding face of a nail grinding pad which does not diminish the nail filing efficacy while also provides beautiful, high quality printing of designs and artwork without color bleeding issues.

The method for printing on the sandpaper or emery paper surface of a nail file, grinding pad for nails or the like provides an improved appearance and merchantability of such grinding pads by maintaining the roughness of the sandpaper surface, preventing color bleeding between neighboring colors.

The method for printing on the sandpaper or emery paper surface of a nail file, grinding pad for nails or the like provides high quality printed designs without affecting the filing or grinding characteristics of the file.

The present invention provides a printing method for printing on the grinding face of a nail grinding pad in which ink is absorbed into the grinding face without forming a film on the grinding face of a nail grinding pad.

The method for printing on the sandpaper or emery paper surface of a nail file, grinding pad for nails or the like provides high quality printed designs without causing color bleeding into other neighboring colors.

The method of the invention permits printing of both opaque and translucent colors and patterns on the grinding face of a nail grinding pad.

In accordance with the invention, printing designs and artwork on the sandpaper face of a nail grinding pad is characterized by spraying an ink composition comprised of a polymer of 60 to 80 weight percent, which is composed of polypropylene glycol and its derivative, polypropylene glycol monomethyl ether; solvent dye or pigment of 2 to 10 weight percent; ethanol of 1 to 4 weight percent; a surfactant of 0.1 to 1.0 weight percent; and resins of 1 to 5 weight percent onto the sandpaper face of a grinding pad through an ink jet plotter printer; printing and drying the inks at the same time by heating the heat rays in the plotter area located directly under the side to be sprayed, and discharging the sprayed a nail grinding pad successively through the bottom of the plotter; and rolling and winding the discharged nail grinding pads.

Desirably, the printing method for printing designs on the sandpaper face of a nail grinding pad is characterized by an average molecular weight of the polymer mixture of polypropylene glycol and its derivative, polypropylene glycol monomethyl ether, which is over 200 daltons.

DETAILED DESCRIPTION OF THE INVENTION

The present invention is a method of printing sandpaper, particularly, the abrasive surfaces of nail files, emery boards, nail grinding pads and the like, using inkjet plotter printers such as those manufactured and sold by Gerber Scientific, Inc. and Lectra S.A.

Color bleeding among adjacent colors on printed sandpaper surfaces is prevented or controlled in the present invention by the formulation and use of an ink composition which is stable and non-bleeding during an inkjet printing process. In particular, the ink composition is formulated to provide aqueous phase separation during printing. The bleeding phenomenon between ink colors is reduced or eliminated by preventing interaction and/or reaction between differently colored ink components.

In one embodiment, aqueous phase separation is provided by compounding ink compositions of different physical properties that are immiscible, so that color mixing is prevented. Thus, in one embodiment, a first ink color comprises an ink composition that includes a polymer added into the aqueous dye vehicle, and a second ink color does not include the polymer and/or includes a second substance that is immiscible with the first ink color polymer/ink mixture. In another embodiment, two different ink colors are two separate aqueous solutions containing two different types of polymers which are immiscible in each other, and form two phases immiscible in each other by being separated into the first phase containing the first polymer and the second phase containing the second polymer. Each immiscible phase is separated from another phase by an interface.

The printing ink used in the practice of this invention therefore contains a polymer, which is nonionic or ionic polymer. Water-soluble and water-insoluble polymer can be used to cause aqueous phase separation according to this invention.

The nonionic polymers used in working examples of this invention are polypropylene glycol and its derivatives whose minimum molecular weight is around 200; polysaccharide and its derivatives; polyvinyl alcohol and its derivatives whose average molecular weight is around 10,000 to 200,000; polysucrose and its derivatives whose average molecular weight is around 40,000 to 400,000 like Ficoll® polysaccharide; and epoxy glycerol and propoxylated glycerol and their derivatives whose average molecular weight is 500 to 10,000.

A preferred derivative of polypropylene glycol is polypropylene glycol monomethyl ether.

Preferred derivatives of polysaccharide include methylcellulose, carboxymethyl cellulose, and its derivatives whose average molecular weight is around 3000 to 2,000,000 daltons.

Dextran is regarded as a typical polysucrose substance of polymer group including glycogen, levan, soluble starch and etc. Preferred derivatives of dextrans are diethylaminoethyl dextrans and hydroxpropyl dextrans.

Preferred embodiments of epoxy glycerol and propoxylated glycerol are LEG ("Liponics® ethoxylated glycerol"); and glycerol propoxylate (methoxylate-co-propoxylate) and its derivatives whose average molecular weight is around 725 to 4,800.

In the preferred embodiment polypropylene glycol is used as a polymer, and most preferably a mixture of polypropylene glycol and polypropylene glycol monomethyl ether is used.

In controlling the color bleeding phenomenon in this invention, there are no restrictions on selection of coloring agents. A dye or pigment can be used as a coloring agent. Aqueous phase separation is affected by vehicles rather than coloring agents. So a coloring agent can be selected regardless of variables such as pH sensitivity and ionic charge.

Examples of dyes suitable for use in the ink composition for printing the sandpaper face of a nail grinding pad in this invention are food black 2, carta black, direct black 19, direct black 51, direct black 109, direct black 154, direct blue 85, direct blue 199, direct red 9, acid yellow 23, acid blue 185, acid blue 9, acid red 52, acid red 249, and reactive red 180. The weight percentage range for the dye used in the ink composition is about 0.7% to 7% by weight for most applications, but in cases where translucent colors are desired the amount of dye should be in the range of 0.1% to 4% by weight percent. Where the dye content is below 0.1% by weight, the concentration of ink is too low to provide a quality imprint. Where the dye content is over 7% by weight, the ink composition will begin to clog the orifices in an inkjet printer, though for some colors this will not be a problem until higher concentrations are used. Various dye compounds can be used.

Surfactants can be used in the ink composition. A small amount of surfactant is used to improve the drying time of the ink and to maintain a stable surface tension between inks. It is important to keep the balance of surface tension between inks manufactured in accordance with this invention. The small amount of a surfactant in the ink composition helps to prevent color bleeding phenomenon between black and colored inks by keeping the balance of the surface tension between inks. Also, since the amount of the surfactant and organic acid is small, compatibility of substances is improved.

The ink composition is sprayed through the inkjet plotter printer onto the sandpaper face of the nail grinding pad. The preferred sandpaper is a white sandpaper with white or transparent grits.

It is possible to print designs onto sandpaper prior to die cutting and adhesion of the sandpaper to a nail care product; or the designs can be printed on the sandpaper surface of an assembled nail care product.

The ink composition preferably is comprised of polymer of 60 to 80 weight percent comprised of polypropylene glycol and its derivatives, and polypropylene glycol monomethyl ether; solvent dye or pigment of 2 to 10 weight percent; ethanol of 1 to 5 weight percent; a surfactant of 0.1 to 1.0 weight percent; and resins of 1 to 5 weight percent.

Preferably, the sandpaper surfaces to be printed are preheated using radiant heating or indirect heating systems so that the printed ink will dry as rapidly as possible to minimize bleeding. Also, post-printing radiant heating or indirect heating can be used to provide rapid drying. Typically, heating elements built into the plotter printer can be used for these purposes.

It has been found that the present invention effectively eliminates color bleeding problems in aqueous inks. Users can get clear prints on the sandpaper face of a nail grinding pad.

The printing method printing on the sandpaper face of a nail grinding pad in accordance with working examples of this invention is not restricted to the working example stated above but it's changeable within the scope that goes out of the technical substance.

What is claimed is:

1. A method of printing on a sandpaper surface, comprising:

printing, with an inkjet plotter printer onto a sandpaper surface, a plurality of differently-colored aqueous ink compositions, each of the compositions having different polymer components whereby the ink compositions when printed onto a sandpaper surface using an inkjet printer are applied without bleeding between adjacent differently-colored aqueous ink compositions, said ink compositions including:

60% to 80% by weight of one or more polymer components selected from the group consisting of: polysaccharide and its derivatives; polyvinyl alcohol and its derivatives whose average molecular weight is around 10,000 to 200,000 daltons; polysucrose and its derivatives whose average molecular weight is around 40,000 to 400,000 daltons; and epoxy glycerol and propoxylated glycerol and their derivatives whose average molecular weight is 500 to 10,000 daltons;

2% to 10% by weight of a solvent dye or a pigment;

1% to 5% by weight percent of ethanol;

0.1% to 1.0% by weight percent of surfactants.

2. The method of claim 1 wherein said printing step further comprises heating the sandpaper surface.

3. A method of printing onto a sandpaper surface of a nail file, comprising:

printing, with an inkjet plotter printer onto an sandpaper surface of a nail file, a plurality of differently-colored aqueous ink compositions, each of the compositions having different polymer components whereby the ink compositions when printed onto a sandpaper surface using an inkjet printer are applied without bleeding between adjacent differently-colored aqueous ink compositions, said ink compositions including:

60% to 80% by weight of one or more polymer components selected from the group consisting of: polysaccharide and its derivatives; polyvinyl alcohol and its derivatives whose average molecular weight is around 10,000 to 200,000 daltons; polysucrose and its derivatives whose average molecular weight is around 40,000 to 400,000 daltons; and epoxy glycerol and propoxylated glycerol and their derivatives whose average molecular weight is 500 to 10,000 daltons;

2% to 10% by weight of a solvent dye or a pigment;

1% to 5% by weight percent of ethanol; and 0.1% to 1.0% by weight percent of surfactants.

4. The method of claim 3 wherein said printing step further comprises heating the sandpaper surface.

5. A method of printing on a sandpaper surface of a nail care product, comprising:

printing, with an inkjet plotter printer onto a sandpaper surface, a plurality of differently-colored aqueous ink compositions, each of the compositions having different polymer components whereby the ink compositions when printed onto a sandpaper surface using an inkjet printer are applied without bleeding between adjacent differently-colored aqueous ink compositions, said ink compositions including:
- 60% to 80% by weight of a polymer component selected from the group consisting of: polysaccharide and its derivatives; polyvinyl alcohol and its derivatives whose average molecular weight is around 10,000 to 200,000; polysucrose and its derivatives whose average molecular weight is around 40,000 to 400,000; and epoxy glycerol and propoxylated glycerol and their derivatives whose average molecular weight is 500 to 10,000;
- 2% to 10% by weight of a solvent dye or a pigment;
- 1% to 5% by weight percent of ethanol;
- 0.1% to 1.0% by weight percent of surfactants.

6. The method of claim 1, wherein the polymer components are selected from the group consisting of: methylcellulose; carboxymethylcellulose; diethylaminoethyl dextran; hydroxypropyl dextran; ethoxylated glycerol; and glycerol propoxylate, wherein each of the ethoxylated glycerol and the glycerol propoxylate has an average molecular weight of 725 to 4,800 daltons.

7. The method of claim 3, wherein the polymer components are selected from the group consisting of: methylcellulose; carboxymethylcellulose; diethylaminoethyl dextran; hydroxypropyl dextran; ethoxylated glycerol; and glycerol propoxylate, wherein each of the ethoxylated glycerol and the glycerol propoxylate has an average molecular weight of 725 to 4,800 daltons.

8. The method of claim 5, wherein the polymer components are selected from the group consisting of: methylcellulose; carboxymethylcellulose; diethylaminoethyl dextran; hydroxypropyl dextran; ethoxylated glycerol; and glycerol propoxylate, wherein each of the ethoxylated glycerol and the glycerol propoxylate has an average molecular weight is 725 to 4,800 daltons.

9. The method of claim 5 wherein said printing step further comprises heating the sandpaper surface.

10. The method of claim 1, wherein the sandpaper surface is white sandpaper with white or transparent grits.

11. The method of claim 3, wherein the sandpaper surface is white sandpaper with white or transparent grits.

12. The method of claim 5, wherein the sandpaper surface is white sandpaper with white or transparent grits.

13. The method of claim 5, wherein the nail care product is a grinding pad, emery board, or nail file.

* * * * *